(12) United States Patent  
Suzuki

(10) Patent No.: US 6,574,095 B2
(45) Date of Patent: Jun. 3, 2003

(54) INPUT DEVICE HAVING KEYBOARD AND TOUCH PAD

(75) Inventor: Shoji Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 69 days.

(21) Appl. No.: 09/879,432

(22) Filed: Jun. 12, 2001

(65) Prior Publication Data

US 2001/0055195 A1 Dec. 27, 2001

(30) Foreign Application Priority Data

Jun. 13, 2000 (JP) ......................................... 2000-177277

(51) Int. Cl.$^7$ ................................................. G06F 1/16
(52) U.S. Cl. ...................................... 361/680; 361/683
(58) Field of Search ................................. 361/680, 681, 361/683, 686

(56) References Cited

U.S. PATENT DOCUMENTS 6,144,551 A 11/2000 Kao
6,266,050 B1 * 7/2001 Oh et al. ..................... 345/173

* cited by examiner

Primary Examiner—Darren Schuberg
Assistant Examiner—Yean-Hsi Chang
(74) Attorney, Agent, or Firm—Brinks Hofer Gilson & Lione

(57) ABSTRACT

There is provided an input device which can prevent click or pointer movement during the key input operation from the keyboard. In the control of the present invention, when a key input monitoring module detects the key input from a keyboard, the input from a touch pad is brought into an inhibit state and a timer is driven; when there is another key input within a set time of the timer, the set time is updated to start clocking again while the input inhibit state from the touch pad is maintained; and when there is no key input within the set time, the input inhibit state from the touch pad is released.

2 Claims, 2 Drawing Sheets

INPUT DEVICE HAVING KEYBOARD AND TOUCH PAD

BACKGROUND OF THE INVENTION

1. Field of the Invention

The present invention relates to an input device for performing key input from a keyboard, more particularly to an input device, for use in, for example, a notebook PC, having a keyboard and a touch pad provided in front of the same.

2. Description of the Prior Art

A typical notebook PC has, as an input device, a keyboard having a large number of input keys and a touch pad provided in front of the keyboard for click or moving the pointer (cursor).

When key input is done from the keyboard in the notebook PC, there is generally employed a style in which both hands are placed on the home positions (blind touch method). There are more than just a few cases in which the thumb or palm is touched on the touch pad due to the layout of the keyboard and touch pad. This causes unintentional click or pointer movement during the key input, resulting in malfunction. From such a fact, there is a problem of poor operativity.

SUMMARY OF THE INVENTION

The present invention overcomes such disadvantages of the prior art, and it is an object of the present invention to provide an input device which can automatically prevent click or pointer movement during the key input operation from the keyboard.

To achieve the foregoing object, first means comprises a keyboard having a large number of input keys, a touch pad provided in front of the keyboard, key input monitoring means for monitoring the key input from the keyboard, timer means for clocking a set time, display means for displaying the input state from the keyboard and touch pad, and control means for controlling the operation of the respective parts, wherein
- when the key input monitoring means detects the key input from the keyboard, the input from the touch pad is brought into an inhibit state and the timer means is driven,
- when there is another key input within the set time of the timer means, the set time is updated to start clocking again while the input inhibit state from the touch pad is maintained, and
- when there is no key input within the set time, the input inhibit state from the touch pad is released.

In second means according to the first means, the set time can be optionally selected by the operator within a predetermined range.

As described above, in the control of the present invention, when the key input monitoring means detects the key input from the keyboard, the input from the touch pad is brought into an inhibit state and the timer means is driven; when there is another key input within the set time of the timer means, the set time is updated to start clocking again while the input inhibit state from the touch pad is maintained; and when there is no key input within the set time, the input inhibit state from the touch pad is released, resulting in prevention of click or pointer movement in key input operation from the keyboard. Thus, malfunction is eliminated, and operativity as an input device can be improved.

DETAILED DESCRIPTION OF THE PREFERRED EMBODIMENTS

Figure 1:
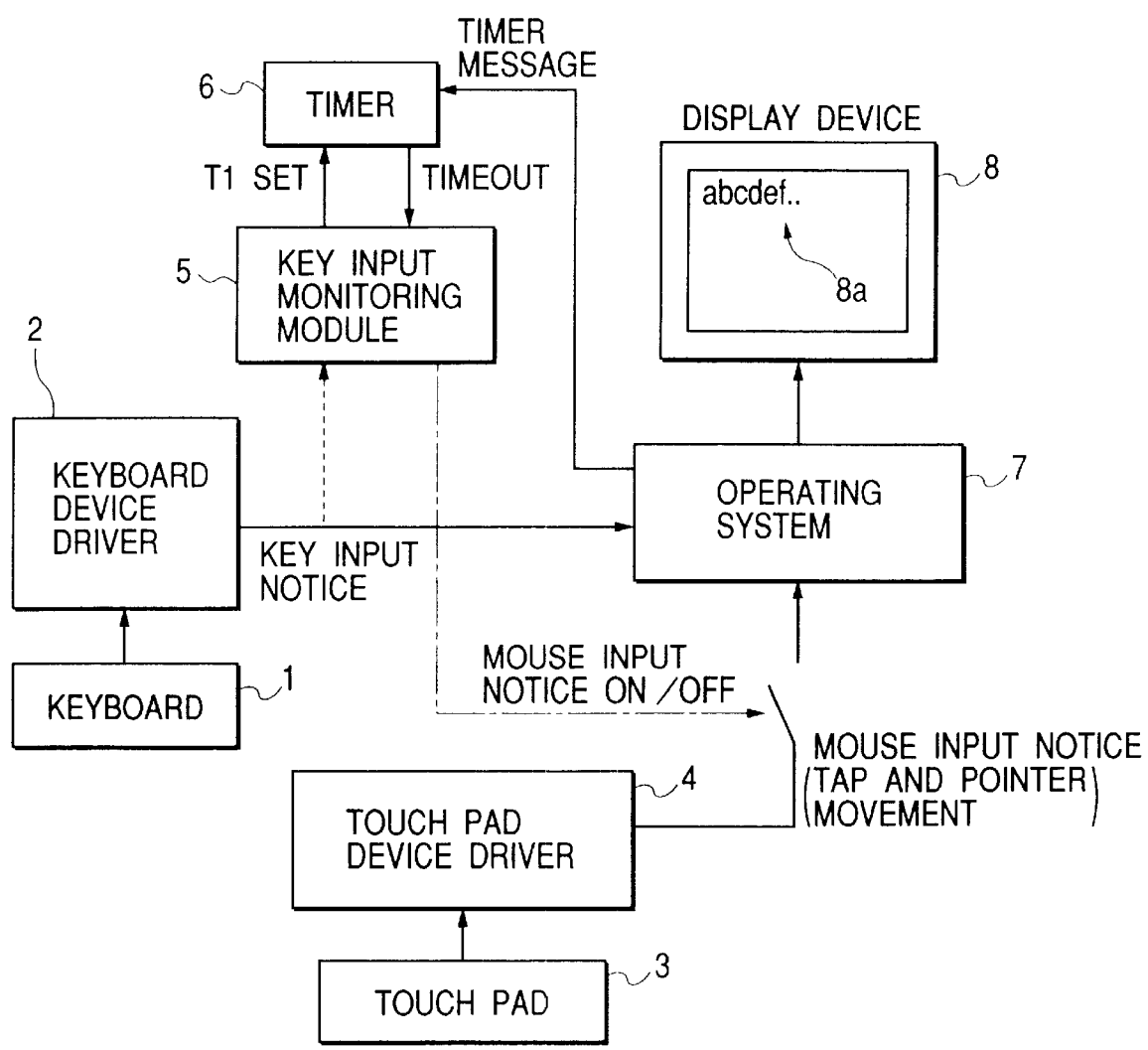
FIG. 1 is a block diagram of the functions of a notebook PC according to an embodiment of the present invention.

Embodiments of the present invention will be described hereinbelow with reference to the drawings. FIG. 1 is a block diagram of the functions of a notebook PC according to an embodiment of the present invention.

The notebook PC has a keyboard 1, a keyboard device driver 2, a touch pad 3, a touch pad device driver 4, a key input monitoring module 5, a timer 6, an operating system 7, and a display device 8. The relation between the respective parts is shown in FIG. 1.

The key input monitoring module 5 always monitors the key input from the keyboard 1 and, upon detection of a key input, controls the input notice related to tap and cursor movement from the device driver 2, so as to bring tap and pointer movement into an inhibit state. In other words, even when the touch pad 3 is touched by mistake during the key input from the keyboard 1, the input is inhibited.

At this time, a specific time value T1 is set to the timer 6 using the service of the operating system 7. The timer 6 is synchronized with a timer message sent periodically from the operating system 7, and then counts down. After movement to the inhibit state, when there is a key input from the keyboard 1 again, the time value T1 is set to the timer 6 again so as to extend the time for the inhibit state. When the value of the timer 6 is 0 (timeout), the previous inhibit state is released so that the normal state in which the touch pad 3 can be operated is returned.

In this embodiment, in the key input from the keyboard 1, the input of the touch pad 3 is inhibited for the time value T1 set to the timer 6, and when there is no key input from the keyboard 1 for the time value T1, the input inhibit state of the touch pad 3 is released. This can prevent unintentional click or pointer movement from being caused during the key input from the keyboard 1 so as to avoid malfunction, and operativity of the input device can be improved.

Figure 2:
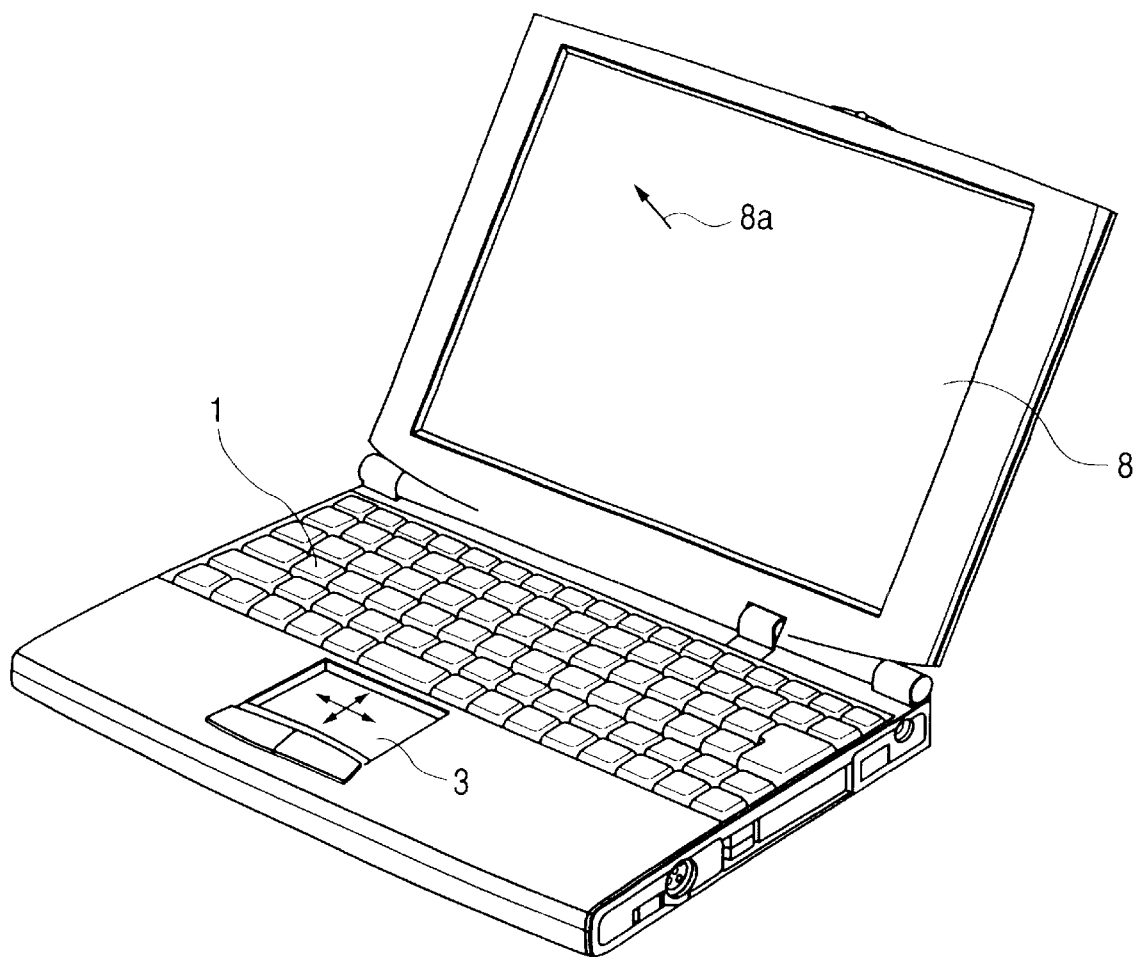
FIG. 2 is an external view of a notebook PC according to an embodiment of the present invention.

FIG. 2 is an external view of a notebook PC according to an embodiment of the present invention. The touch pad 3 is provided in the forward center of the keyboard 1. A pointer (cursor) 8a is shown in the display device 8.

Figure 3:
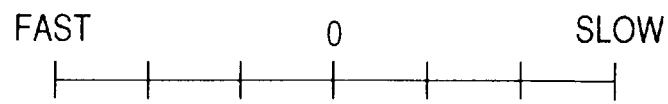
FIG. 3 is an explanatory view in the case where a time value T1 is set.

FIG. 3 is an explanatory view in the case where the time value T1 is set. The time value T1 can be optionally set by the operator using the pointer 8a within the range of, for example, about 0.5 to 4.0 seconds. When the pointer 8a indicates the slow side with respect to 0 on the screen of the display device 8, the time value T1 can be increased. On the contrary, when the pointer 8a indicates the fast side, the timer value T1 can be decreased. When the time value T1 can be optionally set according to the operating ability of the operator, operativity can be further improved.

According to the present invention, in the control of the control means, when the key input monitoring means detects the key input from the keyboard, the input from the touch pad is brought into an inhibit state and the timer means is driven; when there is another key input within the set time of the timer means, the set time is updated to start clocking again while the input inhibit state from the touch pad is maintained; and when there is no key input within the set time, the input inhibit state from the touch pad is released, resulting in prevention of click or pointer movement in key input operation from the keyboard. Thus, malfunction is eliminated, and operativity can be improved.

What is claimed is:

1. An input device comprising:

a keyboard having a large number of input keys;

a touch pad provided in front of the keyboard;

key input monitoring unit to monitor a key input from the keyboard;

a timer to clock a set time;

display to display an input state from the keyboard and touch pad; and a control to control operation of the keyboard, touch pad, key input monitoring unit, timer and display, wherein when the key input monitoring unit detects the key input from the keyboard, input from the touch pad is brought into an inhibit state and the timer is driven, when another key input is performed within the set time, the set time is reset while the inhibit state from the touch pad is maintained, and when no key input is performed within the set time, the input inhibit state from the touch pad is released.

2. The input device according to claim 1, wherein the set time is optionally selected by an operator within a predetermined range.

* * * * *